US012794676B2

(12) United States Patent
Pan et al.

(10) Patent No.: US 12,794,676 B2
(45) Date of Patent: Nov. 10, 2026

(54) MESSAGE EXCHANGE SYSTEM

(71) Applicant: nChain Licensing AG, Zug (CH)

(72) Inventors: Liuxuan Pan, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 172 days.

(21) Appl. No.: 18/578,255

(22) PCT Filed: Jun. 13, 2022

(86) PCT No.: PCT/EP2022/065940
§ 371 (c)(1),
(2) Date: Jan. 10, 2024

(87) PCT Pub. No.: WO2023/285045
PCT Pub. Date: Jan. 19, 2023

(65) Prior Publication Data

US 2024/0313952 A1 Sep. 19, 2024

(30) Foreign Application Priority Data

Jul. 13, 2021 (GB) ...................................... 2110097

(51) Int. Cl.
*H04L 9/08* (2006.01)
*H04L 9/00* (2022.01)
*H04L 9/30* (2006.01)

(52) U.S. Cl.
CPC .............. *H04L 9/0825* (2013.01); *H04L 9/30* (2013.01); *H04L 9/50* (2022.05)

(58) Field of Classification Search
CPC ............ H04L 9/0825; H04L 9/50; H04L 9/30
See application file for complete search history.

(56) References Cited

U.S. PATENT DOCUMENTS 10,659,233 B1 5/2020 Zhou
2019/0236602 A1* 8/2019 Song .................... G06Q 20/385
(Continued)

FOREIGN PATENT DOCUMENTS

CN 108737430 A 7/2020
GB 2589636 A 6/2021
(Continued)

OTHER PUBLICATIONS

Lau J., et al., "Transaction Signature Verification for Version 0 Witness Program," Mar. 1, 2016, [Accessed on Jan. 21, 2021], Retrieved from the Internet: URL: https://github.com/bitcoin/bips/blob/master/bip-0143.mediawiki.
(Continued)

*Primary Examiner* — Darshan I Dhruv
(74) *Attorney, Agent, or Firm* — Galvani Smith PLLC; Rowan P. Smith

(57) ABSTRACT

A computer-implemented method performed in a system comprising a first user with a first public key and a second user, the method comprising: generating, by the first user, a second public key based on: the first public key; a first message; and a signature for the first message generated by the second user; providing, by the first user, the second public key to the second user; determining, by the second user, a third public key based on: the first public key; a second message; and the signature for the second message generated by the second user; verifying, by the second user, whether the third public key is equal to the second public key; and when the third public key is equal to the second public key, determining that the first message is equal to the second message and submitting a transaction comprising the second public key to a blockchain network.

16 Claims, 6 Drawing Sheets

(56) References Cited

U.S. PATENT DOCUMENTS

| | | | | |
|---|---|---|---|---|
| 2020/0098042 | A1 * | 3/2020 | Hoshizuki | H04L 9/50 |
| 2020/0175511 | A1 * | 6/2020 | Chan | G06F 21/64 |
| 2020/0186360 | A1 * | 6/2020 | Chan | G06F 16/27 |
| 2020/0286047 | A1 * | 9/2020 | Joveski | G06Q 20/065 |
| 2021/0049602 | A1 * | 2/2021 | Yang | G06Q 20/3827 |
| 2021/0158411 | A1 * | 5/2021 | Shrinivasan | H04L 9/0637 |
| 2021/0304201 | A1 * | 9/2021 | Li | G06Q 20/401 |

FOREIGN PATENT DOCUMENTS

| | | | | |
|---|---|---|---|---|
| JP | 2019511855 | A | 4/2019 | |
| JP | 2019513312 | A | 5/2019 | |
| JP | 2020513176 | A | 4/2020 | |
| WO | 2017145016 | A1 | 8/2017 | |
| WO | WO-2019220271 | A1 * | 11/2019 | H04L 9/085 |
| WO | WO-2020110025 | A1 * | 6/2020 | H04L 9/3239 |
| WO | 2020165676 | A1 | 8/2020 | |
| WO | 2020165677 | A1 | 8/2020 | |
| WO | 2020165678 | A1 | 8/2020 | |
| WO | 2020165679 | A1 | 8/2020 | |
| WO | 2020165680 | A1 | 8/2020 | |
| WO | 2021059098 | A1 | 4/2021 | |
| WO | 2021130557 | A1 | 7/2021 | |
| WO | 2022037879 | A1 | 2/2022 | |
| WO | 2022100958 | A1 | 5/2022 | |

OTHER PUBLICATIONS

Wallet Workshop, "Simplified Payment Protocol," Moneybutton/ Bips—GitHub, Feb. 22, 2019, [Retrieved on Aug. 17, 2020], 11 pages, Retrieved from the Internet: URL: https://github.com/moneybutton/bips/blob/master/bip-0270.mediawiki.

Zhang W., "Simplified Payment Verification," Aug. 25, 2020, 7 pages, Retrieved from the Internet: URL: https://medium.com/nchain/simplified-payment-verification-48ac60f1b26c.

GB2110097.9 Combined Search and Abbreviated Examination Report dated Jan. 11, 2022, 6 pages.

Liu Zhen et al: "Key-Insulated and Privacy-Preserving Signature Scheme with Publicly Derived Public Key", 2019 IEEE European Symposium on Security and Privacy (EUROS&P), IEEE, Jun. 17, 2019 (Jun. 17, 2019), pp. 215-230.

PCT/EP2022/065940 International Search Report and Written Opinion dated Sep. 28, 2022, 14 pages.

Xu Lei et al: "KCRS: A Blockchain-Based Key Compromise Resilient Signature KCRS: A Blockchain-Based Key Compromise Resilient Signature System System Recommended Citation Recommended Citation", Dec. 23, 2019 (Dec. 23, 2019), pp. 1-14, Retrieved from the Internet: URL: https://core.ac.uk/download/pdf/294834237.pdf.

Gerhardt I., et al., "Homomorphic Payment Addresses and the Pay-to-contract Protocol," arXiv: 1212.3257, Dec 13, 2012, 14 Pages, Retrieved from the Internet URL: https://arxiv.org/abs/1212.3257.

Office Action for Japanese Patent Application No. 2024-501890, mailed on Mar. 31, 2026, 6 pages.

* cited by examiner

Figure 5

| $TxID_{payment}$ | | | |
|---|---|---|---|
| Version | 1 | Locktime | 0 |
| In-count | 1 | Out-count | 2 |
| Input list | | Output list | |
| Outpoint | Unlocking script | Value | Locking script |
| $TxID_{input} \| \| a\ sats$ | $<SIG_{AP}><PK_{AP}>$ | $b$ sats | $<$P2PKH $PK_B>$ |
| | | $(a-b-t)$ sats | $<$P2PKH $PK_{change}>$ |

MESSAGE EXCHANGE SYSTEM

CROSS REFERENCE TO RELATED APPLICATIONS

This application is the U.S. National Stage of International Application No. PCT/EP2022/065940 filed on Jun. 13, 2022, which claims the benefit of United Kingdom Patent Application No. 2110097.9, filed on Jul. 13, 2021, the contents of which are incorporated herein by reference in their entireties.

TECHNICAL FIELD

The present disclosure relates to a method for determining whether a first message is equal to second message.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicized. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

Blockchain networks (e.g. the Bitcoin network) are an efficient means for allowing P2P messaging, interactions and transactions to occur without any intermediation. When interactions occur between users on a blockchain network such as the Bitcoin network, a message summarising the interaction may indicate the actions taken by one party (e.g. by Alice) but will not link the action taken with the message.

For example, a payment may only indicate that the customer (Alice) has paid a merchant (Bob) but not proving the linkage between the actual invoice and the payment. As such, the customer can only prove she has paid to the merchant, but not prove to which invoice the payment relates to. When a dispute occurs about the corresponding invoice, the customer has no evidence other than the invoice provided by the merchant. This leads to a problem in that if the invoice is tampered maliciously by the merchant, it is difficult for the customer to prove what the original agreed-upon exchanged invoice is.

Similar problems may occur on blockchain networks for any type of message, where an action taken by a first party on the blockchain network is not linked to a message on the blockchain network. A message may comprise an invoice, but it will be understood that a message could also relate to any other suitable kind of message on a blockchain (e.g. a contract, a smart contract, etc.).

According to one aspect disclosed herein, there is provided a computer-implemented method performed in a system comprising a first user with a first public key and a second user. The method can include the first user generating a second public key based on their first public key, first message and a signature from the second user for the first message. The method can also include providing, by the first user, the generated second public key to the second user. The method may also include determining, by the second user, a third public key based on the first public key, a second message and a signature for the second message generated by the second user. The method may then include determining, by the second user, if the third public key is equal to the second public key. When the third public key is equal to the second public key, the method comprises determining that the first message is equal to the second message and submitting a transaction comprising the second public key to a blockchain network.

In some examples, a message exchange system is used which encodes exchanged messages into a public key that receives the change. In such examples, no additional output (e.g. an OP_RETURN output) is needed to record the messages on-chain and meanwhile cause the integrity of the recorded messages to be verifiable by both parties.

In some examples, one party's signature over the messages is also recorded in the public key to prove his agreement. This can be used for both parties to maintain the integrity between the received messages off-chain and the recorded one in the public key. Additionally, both parties can verify the integrity of recorded messages through this public key without sharing any key derivation path with each other.

A further aspect is disclosed directed towards the methods performed by the first user in the above paragraph. A further aspect is disclosed directed towards the methods performed by the second user in the above paragraph.

In other aspects, computer equipment and a computer program embodied on computer-readable storage to provide the methods of the above paragraphs are disclosed.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 5 is a schematic of a transaction template used in the P2P message exchange system.

DETAILED DESCRIPTION OF EMBODIMENTS

Example System Overview

Figure 1:
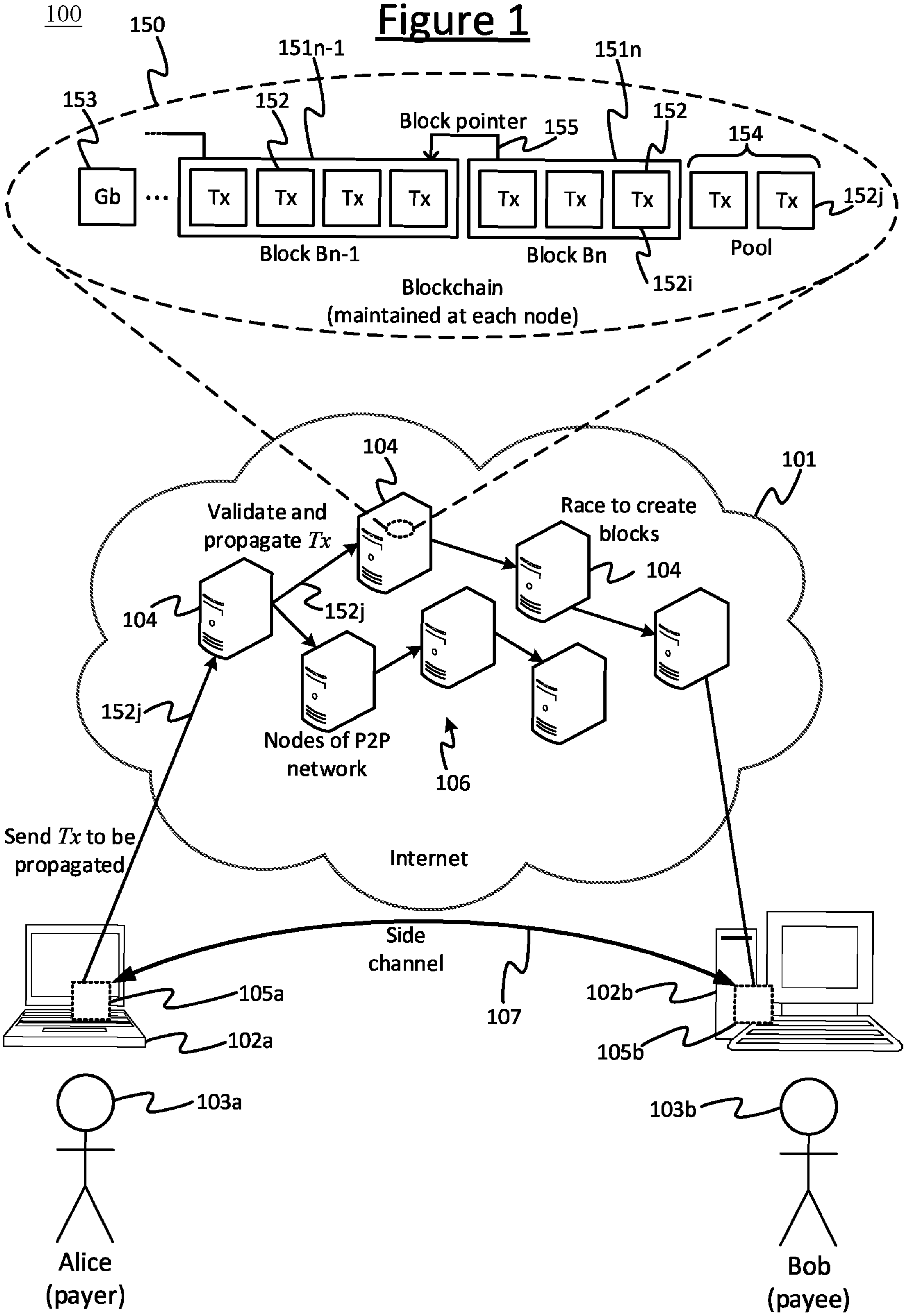
FIG. 1 is a schematic block diagram of a system for implementing a blockchain, FIG. 2 schematically illustrates some examples of transactions which may be recorded in a blockchain.

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs.

The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction **152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152**. Alternatively the condition could simply be a built-in feature of the node protocol, or be defined by a combination of the script and the node protocol.

On condition that the newly received transaction **152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106**.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction **152*j*). Once the proof-of-work has been done for the pool 154 including the new transaction 152*j*, it immutably becomes part of one of the blocks 151 in the blockchain 150. Each transaction 152** comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
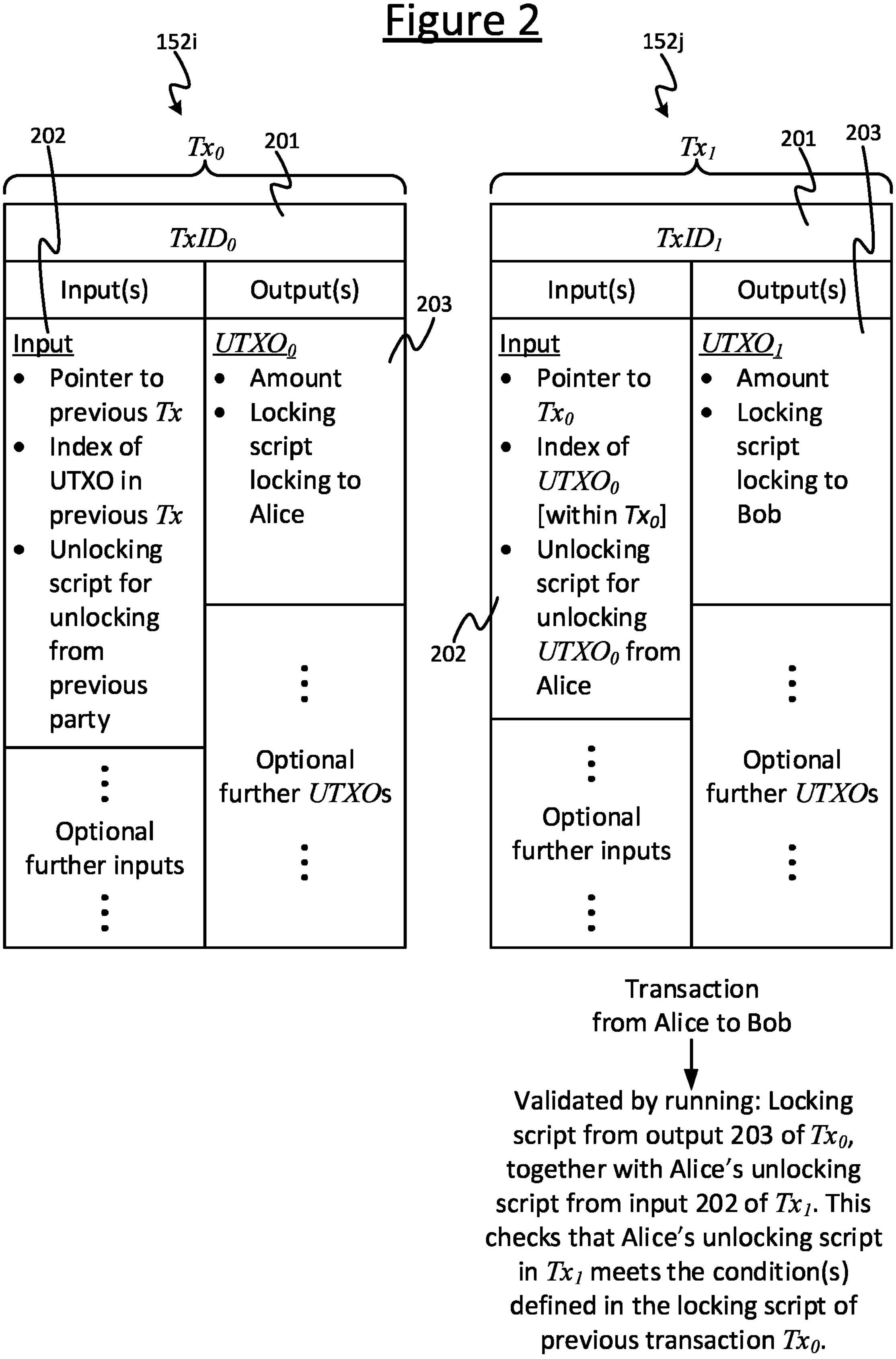

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Side Channel

As shown in FIG. 1, the client application on each of Alice and Bob's computer equipment 102*a*, 120*b*, respectively, may comprise additional communication functionality. This additional functionality enables Alice 103*a* to establish a separate side channel 107 with Bob 103*b* (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102*a*, 102*b*. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

Client Software

Figure 3A:
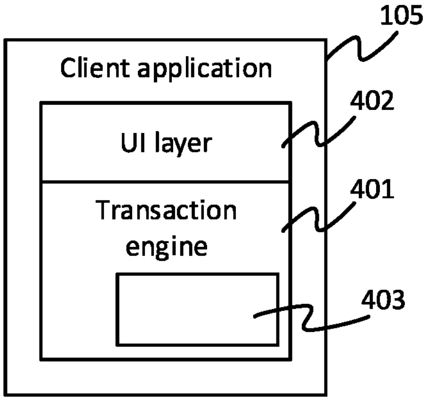
FIG. 3A is a schematic block diagram of a client application.

FIG. 3A illustrates an example implementation of the client application 105 for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
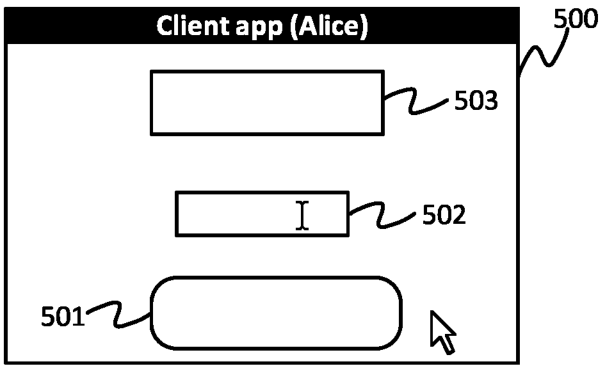
FIG. 3B is a schematic mock-up of an example user interface that may be presented by the client application of FIG. 3A.

FIG. 3B gives a mock-up of an example of the user interface (UI) 500 which may be rendered by the UI layer 402 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands).

Alternatively or additionally, the UI elements may comprise one or more data entry fields 502. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

Node Software

Figure 4:
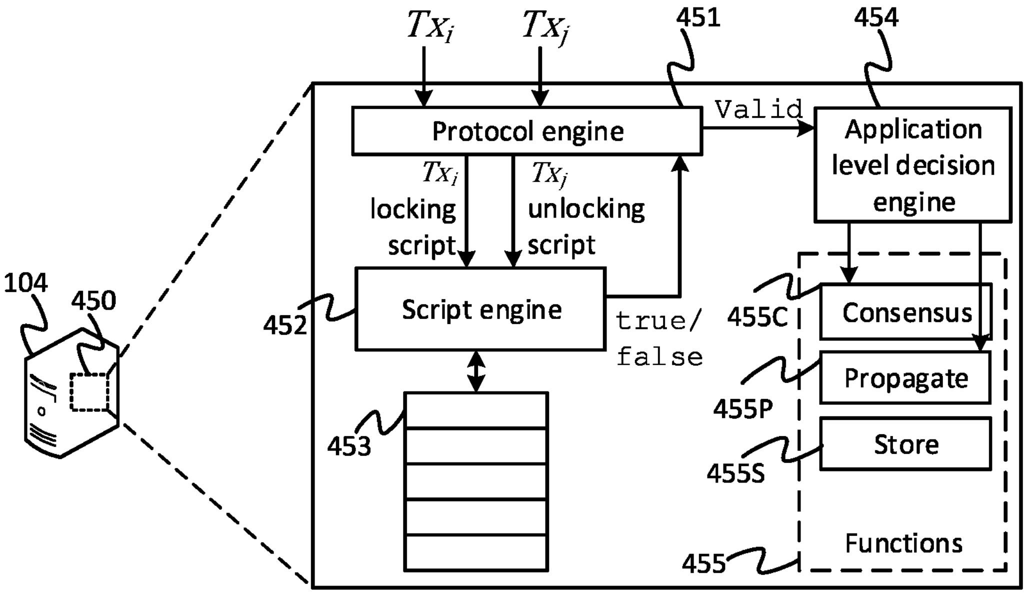
FIG. 4 is a schematic block diagram of some node software for processing transactions.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152*j* ($Tx_j$) is received having an input pointing to an output (e.g. UTXO) of another, preceding transaction 152*i* ($Tx_{m-1}$), then the protocol engine 451 identifies the unlocking script in $Tx_j$ and passes it to the script engine 452. The protocol engine 451 also identifies and retrieves $Tx_j$ based on the pointer in the input of $Tx_j$. $Tx_i$ may be published on the blockchain 150, in which case the protocol engine may retrieve $Tx_i$ from a copy of a block 151 of the blockchain 150 stored at the node 104. Alternatively, $Tx_i$ may yet to have been published on the blockchain 150. In that case, the protocol engine 451 may retrieve $Tx_i$ from the ordered set 154 of unpublished transactions maintained by the node 104. Either way, the script engine 451 identifies the locking script in the referenced output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Message Exchange System

A P2P message exchange system is provided which describes a protocol for direct interaction between two parties for the purpose of swapping a message relating to an action taken by one the of the parties. For example, the message exchange system may be for the purpose of swapping an invoice or a contract related to a payment (e.g. a bitcoin payment).

The protocol enables the interaction process to be recorded on chain, embedded within an action related public key (e.g. payment-related public key) which is verified by both parties independently. This establishes a direct link between the surrounding details of the action (e.g. payment) and the payment itself.

In general, the system comprises at least a first user and a second user. The system may further comprise one or more nodes of a blockchain network 106. Alice 103*a* may be considered as the first user, and Bob 103*b* may be considered as the second user. In general, the first and second users may be configured to perform some or all of the actions described above as being performed by Alice 103*a* and/or Bob 103*b*.

A message may relate to contents related that one party receives in exchange for performing an action. For example, a message may comprise the contents related to a transaction between two parties, a customer (Alice 103*a*) and a merchant (Bob 103*b*). As such, a message may comprise an invoice in some examples.

Alice 103*a* may perform an action for Bob 103*b* (e.g. pay Bob 103*b*) for the contents agreed in a message. In the following, a single message is referred to for simplicity, but more than one message could be used in the same system.

A message could display a number of parameters about an agreement on a blockchain. A message may display at least one of: a price of one or more products; a quantity of products; tax details for a product; VAT %; a total payment amount for one or more products; etc.

In some examples, Bob 103$b$ may have a public key $PK_{BR}$. $PK_{BR}$ may be a well-known public key on a network. $PK_{BR}$ may be used by Bob 103$b$ to communicate with another user such as Alice 103$a$. Alice 103$a$ may be a customer of Bob 103$b$.

In some examples, Alice 103$a$ may create an account with Bob 103$b$. This account may include registration of a public key of Alice 103$a$, $PK_{AR}$, to Bob 103$b$. In turn, Alice 103$a$ may receive an account code from Bob 103$b$. This account code may comprise a customer ID associated with Alice's public key $PK_{AR}$. If a customer ID is used in this way, Alice 103$a$ does not need to share her public key to Bob 103$b$ in communications after creation of the account code. Instead, Alice 103$a$ can be identified by Bob 103$b$ using the account code.

According to an example, Alice 103$a$ and Bob 103$b$ can use a cryptography-based secret sharing scheme (e.g. a Diffie-Hellman exchange, or similar). Alice 103$a$ and Bob 103$b$ have each other's public keys $PK_{AR}$ and $PK_{BR}$. However, any other suitable scheme may be used to enable Alice 103$a$ and Bob 103$b$ to have each other's public keys. Alice 103$a$ and Bob 103$b$ may establish a secure communication channel to exchange a message (e.g. an invoice, a contract) and any other information.

In some examples, $PK_{AR}$ and $PK_{BR}$ are not used to receive any payments, such that they do not appear on-chain.

A message may be denoted by IV. A public key $PK_B$ controlled by Bob 103$b$ may be used to receive payments. A signature $SIG_{BR}$ over the invoice is generated by Bob 103$b$ using his private key with respect to $PK_B$. This signature may be considered as Bob's commitment that he will provide goods or services in response to an agreement in the message IV if Alice 103$a$ completes the payment to the message IV.

An invoice number may be generated using a message IV and the signature generated by Bob 103$b$, $SIG_{BR}$. For example, an invoice number may be generated with a SHA-256 hash in the following way:

$$IV_D = SHA\text{-}256(IV + SIG_{BR}),$$

where the symbol "+" represents the concatenation. In other examples, other hashes other than the SHA-256 hash may be used.

Bob 103$b$ may send a message to Alice 103$a$. In some examples, Bob 103$b$ sending a message to Alice 103$a$ may comprise Bob 103$b$ offering an invoice or contract to Alice 103$a$.

If Alice 103$a$ requires amendments to the message in order to reach an agreement, Bob 103$b$ needs to update the contents of the message and re-generate a digital signature (e.g., using Elliptic Curve Digital Signature Algorithm (ECDSA)) for each new iteration of the message until both parties reach a final agreement. Having arrived at an agreement, Alice 103$a$ can verify the signature $SIG_{BR}$, to ensure that Bob 103$b$ signs on the agreed message.

Any suitable signature scheme that allows Alice 103$a$ to verify Bob's signature is applicable in the system.

When Bob 103$b$ and Alice 103$a$ reach an agreement based on the message, Bob 103$b$ may send transaction template information to Alice 103$a$. The transaction template information may comprise a payment transaction template.

An example of a payment transaction template is shown in FIG. 5. In some examples, the payment transaction template may comprise a public key used by Bob 103$b$ to receive funds from Alice 103$a$.

The exemplary transaction template of FIG. 5 is for a transaction $TxID_{payment}$. The transaction template has a Version value of "1", a Locktime of "0", an In-count of "1" and an Out-count of "0". It will be understood that any suitable value may be used for the properties. The Outpoint of the Input list for the transaction template may be $TxID_{input}\|a$ sats. The unlocking script of the input list may be <$SIG_{AP}$><$PK_{AP}$> where $PK_{AP}$ is a public key of Alice 103$a$ and $SIG_{AP}$ is a signature from the public key $PK_{AP}$. The output list of the transaction template of FIG. 5 may comprise a value of b sats with a locking script of <P2PKH $PK_B$>. The output list of the transaction template may also comprise a value of (a–b–t) sats with a locking script of <P2PKH $PK_{change}$>, where t is a transaction fee.

On receipt of the transaction template information, Alice 103$a$ may provide a valid signature $SIG_{AP}$ from her public key $PK_{AP}$ in the unlocking script. In addition, Alice 103$a$ also includes a change address, <P2PKH $PK_{change}$> as a second output in the output list of the payment transaction, where P2PKH represents the well-known pay-to-public-key hash locking script and $PK_{change}$ is the public key to which the second output is locked.

In this example, we only consider a situation where Bob 103$b$ uses a single public key $PK_B$ to receive payment. However, in other examples, Bob 103$b$ could distribute a payment amount he is to receive across multiple public keys.

The messaging system can, in some examples, embed the message into a payment-related public key. This can be used to prove integrity of the message (e.g. to prove the integrity of a recorded invoice).

To prove integrity, a second message IV' sent from Bob 103$b$ to Alice 103$a$ and used to generate a signature from Bob 103$b$, $SIG_{BR}$, should be equal to a first message IV embedded into a payment-related public key $PK_{change}$ and recorded on chain. If they are not equal, it may be difficult for Alice 103$a$ to obtain a refund or for Bob 103$b$ to audit his income properly.

To ensure that a message IV' provided by Bob 103$b$ is the same as a message IV recorded on chain, the message IV can be used to generate $PK_{change}$.

In some examples, a first public key $PK_{AR}$ (a public key of Alice 103$a$), a first message IV, and a signature $SIG_{BR}$ for the first message IV generated by the second user (Bob 103$b$) can be used to generate a second public key $PK_{change}$.

According to an example $PK_{change}$ is generated in the following way:

$$PK_{change} = PK_{AR} + IV_{ID} \times G = PK_{AR} + SHA\text{-}256(IV + SIG_{BR}) \times G,$$

where G is the elliptic curve generator point. It should be noted that any suitable hash function other than SHA-256 could be used (e.g. SHA-512). Note also that multiple hash functions may be used, e.g. double SHA-256.

For a first user, Alice 103$a$, to verify and record a message (e.g. an invoice), Alice 103$a$ can first verify $SIG_{BR}$ with the given IV' and $PK_B$ using any suitable known signature verification technique. If $SIG_{BR}$ is not valid, then this requires Bob 103$b$ to resend the $SIG_{BR}$ that should be generated with IV'. Alice 103$a$ can then generate the public key $PK_{change}$ based on $PK_{AR}$ and the message IV (where IV will be used as a message embedded into $PK_{change}$ and used and recorded on chain if IV' is found to equal IV). In some examples, $PK_{change}$ can be determined using the equation $PK_{change}=PK_{AR}+\text{SHA-256}(IV+SIG_{BR})\times G$. Then an address for the public key $PK_{change}$ can be used as an output in the transaction template.

For a second user, Bob 103*b*, to verify a message (e.g. an invoice), Bob 103*b* can generate a public key $PK_{change}$ using Alice's public key $PK_{AR}$, Bob's signature $SIG_{BR}$ and a message IV' sent from Bob 103*b* to Alice 103*a*. In some examples, $PK_{change}$ can be determined using the equation $PK'_{change}=PK_{AR}+\text{SHA-256}(IV'+SIG_{BR})\times G$. Then, Bob 103*b* can check if $PK'_{change}=PK_{change}$. If $PK'_{change}=PK_{change}$, then Bob 103*b* can determine that IV'=IV.

In some example situations, it is possible that the message IV is not added or is added incorrectly in the payment transaction. If Alice 103*a* was then to submit the signed transaction to a blockchain network 106 (e.g. the Bitcoin network) without the transaction containing the invoice-related public key $PK_{change}$ or with the incorrect invoice in the public key, then Alice 103*a* would risk not being able to provide a tamper-resistant link between the message IV and the corresponding payment if disputes were to arise. To avoid this, in some examples Bob 103*b* may require Alice 103*a* to refill the template with the correct $PK_{change}$ generated based on the message IV. Bob 103*b* could explain the risk of incorrect recording to Alice 103*a* that she may not be able to provide a provable link between the correct message IV (e.g. an invoice IV) and the payment transaction if she requests refunds. If Alice 103*a* agrees to use the correct public key $PK_{change}$ generated based on the message IV, Alice 103*a* could resend the signed payment transaction.

In some examples, if Bob 103*b* makes any amendment to the signed transaction received from Alice 103*a* before submitting the amended signed transaction to a blockchain network 106, then transaction validation by nodes of the blockchain network 106 will fail. For example, if Bob 103*b* makes any amendments to the signed transaction and then submits it to the blockchain network 106, it may lead to the transaction validation by the blockchain nodes to fail. This can be achieved by Alice 103*a* generating $SIG_{AP}$ based on the signed message that uses a SIGHASH_ALL flag. More details on transaction signature verification can be found in "BIP143, Transaction Signature Verification for Version 0 Witness Program, Johnson Lau and Pieter Wuille, 2016 Jan. 3, Available at https://github.com/bitcoin/bips/blob/master/bip-0143.mediawiki.

In some examples, rather than Alice 103*a* submitting the signed transaction to a blockchain network 106 first, she may send the signed transaction to Bob 103*b* for Bob 103*b* to submit the signed transaction to the blockchain network 106. In such examples, this can be useful when Alice 103*a* is offline and is unable to connect to the blockchain network 106 at the point of payment. In this context, sending the signed transaction to Bob 103*b* (who is assumed in this example to be online) can enable a signed transaction to be submitted more quickly to the blockchain (assuming Bob 103*b* accepts the responsibility in this example). Further, in such examples, Alice 103*a* sending the signed transaction to Bob 103*b* allows Bob 103*b* a review of the transaction is required by Bob 103*b* to ensure that the message is added correctly in the public key $PK_{change}$. The correct recording of the message will benefit Alice 103*a* and Bob 103*b* in for future disputes and proofs.

In some examples, a tax authority may require that Bob 130*b* and Alice 103*a* both report the transaction ID and the corresponding message. Therefore, a tax authority may identify that Bob 103*b* and/or Alice 103*a* are not tax-compliant if there are inconsistencies between their claims and the reported message IV embedded in the payment transaction.

Figure 6:
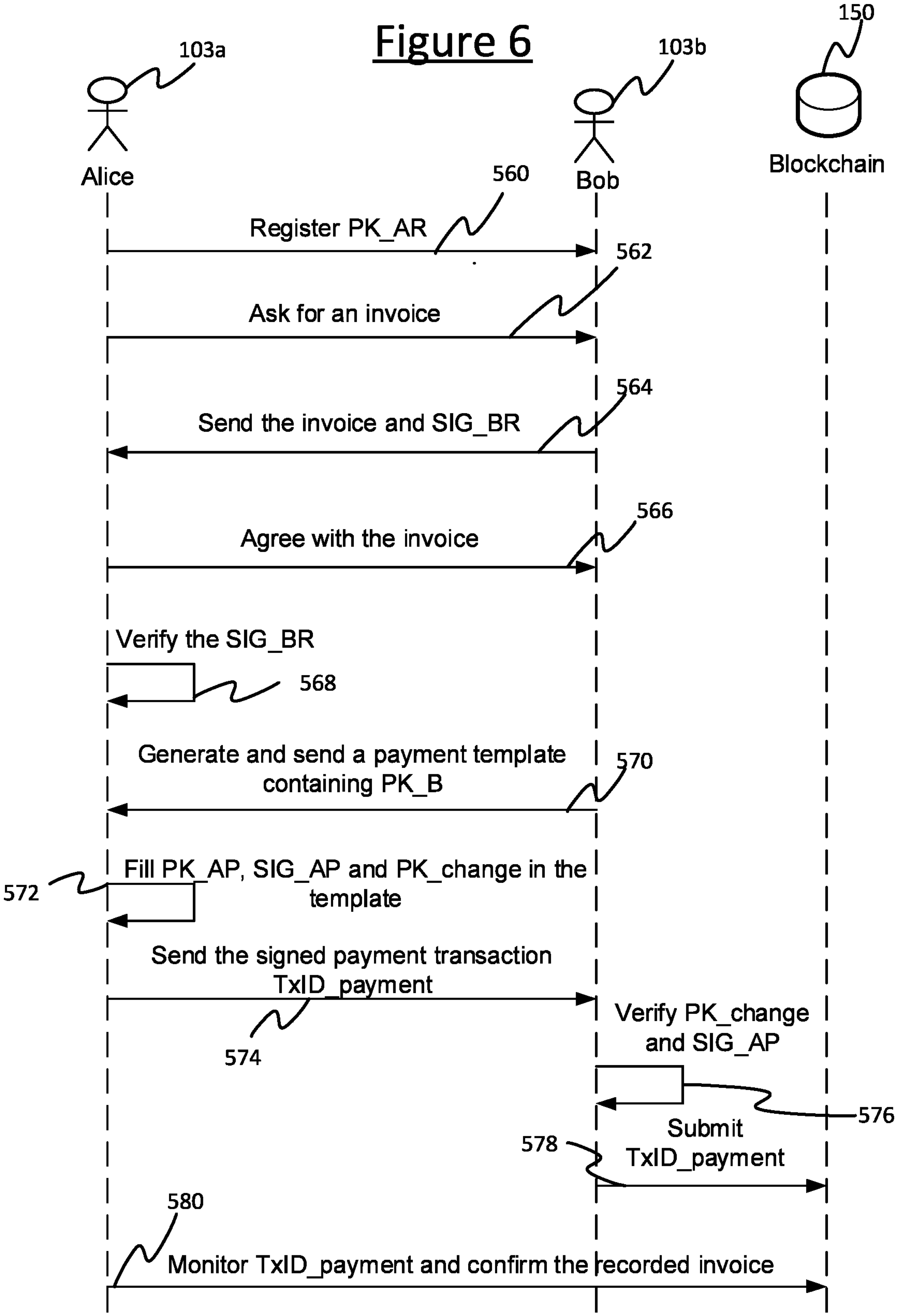
FIG. 6 is an example method flow for a P2P message exchange system.

An example method flow for the P2P message exchange is shown in FIG. 6.

At 560, a first user, Alice 103*a*, registers a public key belonging to her with a second user, Bob 103*b*, to get an account code.

At 562, Alice 103*a* asks Bob 103*b* for a message. The message may relate to an agreement. The message may comprise an invoice or contract, or any other suitable message that can be recorded on a blockchain network 106.

Alice 103*a* and Bob 103*b* may then establish a secure communication channel using $PK_{AR}$ and $PK_{BR}$ (e.g. a Diffie-Hellman-based key exchange) or any other applicable secret key share methodologies. Using a secure communication channel can prevent communication content such as $SIG_{BR}$, the template for $TxID_{payment}$ and the messages between Alice 103*a* and Bob 103*b* being leaked, which would expose the privacy of Alice 103*a* and Bob 103*b*.

At 564, Bob 103*b* sends a message IV' and corresponding signature $SIG_{BR}$ to Alice 103*a*.

At 566, if Alice 103*a* is happy with the requirements of message IV' then Alice 103*a* may agree with the message IV'. At 568, Alice 103*a* may then verify the $SIG_{BR}$ using any suitable signature verification method.

At 570, if Bob 103*b* has not received a rejection of message IV' in a certain time period, or has received Alice's agreement with the message IV' based on an agreement received at 566, Bob 103*b* may generate transaction template information to send to Alice 103*a*. The transaction template information may be of a similar format to the template shown in FIG. 5 (although missing the information filled in by Alice 103*a* at this stage). The transaction template information may be missing $TxID_{input}$, $SIG_{AP}$, $PK_{AP}$ and $PK_{change}$, which is later filled in by Alice 103*a*. The transaction template information may comprise a payment amount and a public key $PK_B$ of Bob 103*b*. Bob 103*b* can then send the transaction template information to Alice 103*a*.

At 572, Alice 103*a* fills in the transaction template information received from Bob 103*b*. Alice 103*a* may then fill the transaction template information with the $TxID_{input}$, the public key $PK_{change}$ as a change output and then signs the payment transaction, $TxID_{payment}$. Alice may also fill in $SIG_{AP}$ and $PK_{AP}$.

At 574, Alice 103*a* sends the signed payment transaction $TxID_{payment}$ to Bob 103*b*. At 574, Alice 103*a* may also send the full data of $TxID_{input}$, the Merkle paths of $TxID_{input}$, and the block height B; that the $TxID_{input}$ is in.

By performing step 574, the transaction can be implemented when Alice 103*a* is offline.

Using the information provided at 574, Bob 103*b* can query a third party to check whether an input payment (e.g. bitcoins) are spent or not (if he does not have a copy of the entire list of block headers). If the input transaction is not double spent, Bob 103*b* can verify the validity of Alice's signature $SIG_{AP}$ to ensure that Alice 103*a* has the full control over the input payment (e.g. bitcoins) and can transfer the payment (e.g. bitcoins) to him with her signature $SIG_{AP}$. A method for signature verification that could be used is described in "Simplified Payment Verification-Instant payment, signature validity, and the importance of integrity", 2020, [Online]. Available: https://medium.com/nchain/simplified-payment-verification-48ac60f1b26c. In this case, Bob 103*b* can have more confidence that the payment transaction will be valid on the blockchain network 106 such that Bob 103*b* will be willing to complete the trade.

At 576 Bob 103*b* verifies the public key $PK_{change}$ to ensure that the message to be embedded is correct. To verify the public key $PK_{change}$, Bob 103*b* can generate a public key $PK'_{change}$ using Alice's public key $PK_{AR}$, Bob's signature $SIG_{BR}$ and a message IV' sent from Bob 103*b* to Alice 103*a*. In some examples, $PK_{change}$ can be determined using the equation $PK'_{change}=PK_{AR}+SHA\text{-}256(IV'+SIG_{BR})\times G$. Then, Bob 103*b* can check if $PK'_{change}=PK_{change}$. If $PK'_{change}=PK_{change}$, then Bob 103*b* can determine that IV'=IV.

If Bob 103*b* can verify that IV'=IV, he can confirm that message IV has been included in the public key $PK_{change}$ correctly.

Upon verifying that IV'=IV, the payment transaction can be submitted to a blockchain 150 (or rather, to the blockchain network 106 to be recorded on the blockchain 150).

At step 580, Alice 103*a* monitors the blockchain 150 to make sure that the payment transaction $TxID_{payment}$ for the message IV is submitted by Bob 103*b*. In some examples, to monitor the blockchain 150 to make sure that the payment transaction $TxID_{payment}$ for the message IV is submitted by Bob 103*b*, Alice 103*a* may make a targeted ad hoc request to a node of the blockchain 150 to see whether they have registered $TxID_{payment}$. In other examples, Alice 103*a* can use a user account to receive an alert when the payment transaction $TxID_{payment}$ is submitted to blockchain 150. A method for providing such an alert is described in GB2013056.3.

By computing the public key $PK_{change}$ using message IV, Alice 103*a* can avoid malicious activity from Bob 103*b*. For example, if Bob 103*b* could try to trick Alice 103*a* and send her a rejection stating that she has not paid for a related message IV (e.g. an invoice or a contract), but in fact, the payment transaction $TxID_{payment}$ been submitted to the blockchain 150. If this was to happen, Alice 103*a* can monitor the blockchain 150 to confirm that the payment transaction is valid on the blockchain 150. Therefore, she can prove that she has paid to Bob's public key shown in the $TxID_{payment}$, and her selected public key $PK_{change}$ states that the message and Bob's signature are embedded in that payment. In examples, Alice 103*a* is expected to save her messages (e.g. invoices) as well as the corresponding signatures from Bob 103*b*.

Some examples embed a message IV (e.g. an invoice) and a merchant Bob's signature of the message IV into a customer Alice's public key $PK_{change}$ that receives the transaction's change. This enables Alice 103*a* to maintain a consistency between her received invoice off-chain and the recorded one in the public key $PK_{change}$. If Alice 103*a* is audited, she can provide the evidence that she has paid Bob 103*b* through the payment transaction without requiring the child key derivation path. If Bob 103*b* is audited, he can provide his signature, the corresponding invoice and the $TxID_{payment}$ to prove that he has received the payment related to the invoice.

Some examples reduce a number of transmissions between Alice 103*a*, Bob 103*b* and the blockchain 150 to keep message (e.g. invoice) recording and signature approval in a same transaction. Alice 103*a* records the message in $PK_{change}$ and approves it by signing the payment transaction. Bob 103*b* offers Alice 103*a* his signature $SIG_{BR}$ that is included into the payment transaction to show his approval to the invoice.

In some examples, to reduce the risk of unrecoverable keys, Alice 103*a* can set the unspent transaction output (UTXO) associated with one or more public keys $PK_{change}$ to dust and allocates a larger amount UTXO to another public key controlled by her but without linking the invoice.

In some examples, a change address may not be necessary in a transaction because the returned funds are too small (less than dust). In such an example, Alice 103*a* can address the input values to make the change address essential.

Some examples record a message correctly and immutably on the blockchain 150 in an efficient manner on the blockchain. This can be particularly useful if the message is important to Alice 103*a* and/or Bob 103*b*.

CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.]

Statement 1: A computer-implemented method performed in a system comprising a first user with a first public key and a second user, the method comprising: generating, by the first user, a second public key based on: the first public key, a first message, and a signature for the first message generated by the second user; providing, by the first user, the second public key to the second user; determining, by the second user, a third public key based on: the first public key, a second message, and the signature for the second message generated by the second user; verifying, by the second user, whether the third public key is equal to the second public key; and when the third public key is equal to the second public key, determining that the first message is equal to the second message and submitting a blockchain transaction comprising the second public key to a blockchain network.

According to some examples, the blockchain transaction may comprise an output locked to the second public key.

Statement 2: The method of statement 1, wherein prior to providing, by the first user, the second public key to the second user, the method comprises: receiving, by the first user, a message and a signature for the message generated by the second user; verifying, by the first user, the signature for the message generated by the second user; sending, from the first user to the second user, a positive response to the message; and determining, by the first user, to generate the second public key using the received message as the first message and the received signature for the message as the signature for the first message generated by the second user.

Statement 3: The method of statement 1, wherein prior to providing, by the first user, the second public key to the second user, the method comprises: receiving, by the first user, a message and a signature for the message generated by the second user; sending, from the first user to the second user, a negative response to the message; generating, by the second user, a further message based on the negative response; generating, by the second user, a signature for the further message; receiving, by the first user, the further message and the signature of the second user for the further message; verifying, by the first user, the signature for the further message generated by the second user; sending, from the first user to the second user, a positive response to the further message; and determining, by the first user, to generate the second public key using the received further message and the received signature for the further message.

Statement 4: The method of statement 2 or statement 3, wherein when a positive response is sent from the first user to the second user, the method comprises: sending transaction template information from the second user to the first user in response to the second user receiving the positive response from the first user, the transaction template information comprising a fourth public key of the second user in a first locking script of the transaction template information; using, by the first user, the transaction template information to provide details of the blockchain transaction by: providing a signature from a fifth public key of the first user in an unlocking script of the transaction template information; providing transaction input information as an outpoint in the transaction template; and including the second public key in a second locking script of the transaction template information.

Statement 5: The method of statement 4 comprising: sending, from the first user to the second user, information of the blockchain transaction based on the transaction template information; sending, from the first user to the second user, full data of a transaction referenced by an input of the blockchain transaction; sending, from the first user to the second user, a Merkle path for the transaction referenced by the input of the blockchain transaction; and sending, from the first user to the second user, a block height of a block comprising the transaction referenced by the input of the blockchain transaction.

Statement 6: The method of any preceding statement, the method comprising: when the third public key is not equal to the second public key, sending from the second user to the first user a request for the first user to provide a sixth public key to replace the second public key.

Statement 7: The method of any preceding statement, comprising: monitoring the blockchain network by the first user to check whether the transaction has been submitted on the blockchain network.

Statement 8: The method of any preceding statement, wherein the message comprises at least one of: an invoice; a contract; an agreement.

According to some examples, the receiving, by the first user, the message and the signature for the first message generated by the second user is performed over a secure channel.

According to some examples, the second public key comprises a change address.

According to some examples, the third public key comprises a change address.

Statement 9: A computer-implemented method performed by a second user, the method comprising: generating a signature for a first message; receiving, from a first user, a second public key generated from: a first public key of the first user, a first message, and the signature for the first message; determining, a third public key based on: the first public key, a second message, and the generated signature for the second message; verifying whether the third public key is equal to the second public key; and when the third public key is equal to the second public key, determining that the first message is equal to the second message and submitting a blockchain transaction comprising the second public key to a blockchain network.

According to some examples, the blockchain transaction may comprise an output locked to the second public key.

Statement 10: The method of statement 9, wherein prior to receiving the second public key from the first user, the method comprises: generating a signature for a message; sending, to the first user, the message and the signature for the message; and receiving, from the first user, a positive response to the message.

Statement 11: The method of statement 9, wherein prior to receiving the second public key from the first user, the method comprises: generating a signature for a message; sending, to the first user, the message and the signature for the message; receiving, from the first user, a negative response to the message; generating a further message based on the negative response; generating a signature for the further message; sending, to the first user, the further message and the signature for the further message; and receiving, from the first user, a positive response for the further message from the first user.

Statement 12: The method of statement 10 or statement 11, wherein when a positive response is received from the first user, the method comprises: sending transaction template information to the first user, the transaction template information comprising a fourth public key of the second user in a first locking script of the transaction template information; receiving details of the transaction from the first user based on the transaction template information, the details of the blockchain transaction comprising: a signature from a fifth public key of the first user in an unlocking script of the transaction template information; transaction input information in an outpoint in the transaction template; and the second public key in a second locking script of the transaction template information.

Statement 13: The method of statement 12 comprising: receiving, from the first user, information of the blockchain transaction based on the transaction template information; receiving, from the first user, full data of a transaction referenced by an input of the blockchain transaction; receiving, from the first user, a Merkle path of the transaction referenced by the input of the blockchain transaction; and receiving, from the first user, a block height of a block comprising the transaction referenced by the input of the blockchain transaction.

Statement 14: The method of any of statements 9 to 13, the method comprising: when the third public key is not equal to the second public key, sending to the first user a request for the first user to provide a sixth public key to replace the second public key.

Statement 15: A method of any of statements 9 to 14, wherein the message comprises at least one of: an invoice, a contract, an agreement.

According to some examples, sending the message and the signature for the first message is performed over a secure channel.

According to some examples, the second public key comprises a change address.

According to some examples, the third public key comprises a change address.

Statement 16: A computer-implemented method performed by a first user having a first public key, the method comprising: generating a second public key for a transaction based on: a first public key, a first message, and a signature for the first message generated by a second user; and providing the second public key to the second user.

Statement 17: The method of statement 16, wherein prior to providing the second public key to the second user, the method comprises: receiving, from the second user, a message and a signature for the message generated by the second user; and verifying the signature for the message generated by the second user; sending, to the second user, a positive response to the message; and determining to generate the second public key using the received message and the received signature for the message.

Statement 18: The method of statement 17, wherein prior to providing the second public key to the second user, the method comprises: receiving a message and a signature for the message generated by the second user; sending, to the second user, a negative response to the message; receiving a further message and a signature of the second user for the further message; verifying the signature for the further message generated by the second user; sending, to the second user, a positive response to the further message; and determining to generate the second public key using the received further message and the received signature for the further message.

Statement 19: The method of statement 17 or statement 18, wherein when a positive response is sent to the second user, the method comprises: receiving transaction template information from the second user in response to the second user receiving the positive response, the transaction template information comprising a fourth public key of the second user in a first locking script of the transaction template information; and using the transaction template information to provide details of the blockchain transaction by: providing a signature from a fifth public key of the first user in an unlocking script of the transaction template information; providing transaction input information as an outpoint in the transaction template; and including the second public key in a second locking script of the transaction template information.

Statement 20: The method of statement 19 comprising: sending, to the second user, information of the blockchain transaction based on the transaction template information; sending, to the second user, full data of the transaction referenced by an input of the blockchain transaction; sending, to the second user, Merkle paths of the transaction referenced by the input of the blockchain transaction; and sending, to the second user, a block height of a block comprising the transaction referenced by the input of the blockchain transaction.

Statement 21: The method of any of statements 16 to 20, comprising: when the third public key is not equal to the second public key, receiving from the second user a request to provide a sixth public key to replace the second public key.

Statement 22: The method of any of statements 16 to 21, comprising: monitoring the blockchain network to check whether the transaction has been submitted on the blockchain network.

Statement 23: The method of any of statements 16 to 22, wherein the message comprises at least one of: an invoice, a contract, an agreement.

According to some examples, the receiving, by the first user, the message and the signature for the first message generated by the second user is performed over a secure channel.

According to some examples, the second public key comprises a change address.

According to some examples, the third public key comprises a change address.

Statement 24. Computer equipment comprising: memory comprising one or more memory units; and processing apparatus comprising one or more processing units, wherein the memory stores code arranged to run on the processing apparatus, the code being configured so as when on the processing apparatus to perform the method of any of statements 1 to 23.

Statement 25: A computer program embodied on computer-readable storage and configured so as, when run on one or more processors, to perform the method of any of statements 1 to 23.

According to another aspect disclosed herein, there may be provided a method comprising the actions of the first user and the second user.

According to another aspect disclosed herein, there may be provided a system comprising the computer equipment of the first user and the second user.

The invention claimed is:

1. A computer-implemented method performed in a system comprising a first user with a first public key and a second user, the method comprising:

generating, by the first user, a second public key based on: the first public key, a first message sent from the second user to the first user, and a signature for the first message generated by the second user;

providing, by the first user, the second public key to the second user;

determining, by the second user, a third public key based on: the first public key, a second message, and the signature for the second message generated by the second user;

verifying, by the second user, whether the third public key is equal to the second public key;

when the third public key is equal to the second public key, determining that the first message is equal to the second message and submitting a blockchain transaction comprising the second public key to a blockchain network;

wherein prior to providing, by the first user, the second public key to the second user, the method comprises:

receiving, by the first user, a message and a signature for the message generated by the second user;

verifying, by the first user, the signature for the message generated by the second user;

sending, from the first user to the second user, a positive response to the message;

determining, by the first user, to generate the second public key using the received message as the first message and the received signature for the message as the signature for the first message generated by the second user;

wherein when the positive response is sent from the first user to the second user, the method comprises:

sending transaction template information from the second user to the first user in response to the second user receiving the positive response from the first user, the transaction template information comprising a fourth public key of the second user in a first locking script of the transaction template information;

using, by the first user, the transaction template information to provide details of the blockchain transaction by:

providing a signature from a fifth public key of the first user in an unlocking script of the transaction template information;

providing transaction input information as an outpoint in the transaction template; and including the second public key in a second locking script of the transaction template information.

2. The method of claim 1, wherein prior to providing, by the first user, the second public key to the second user, the method comprises:

receiving, by the first user, a message and a signature for the message generated by the second user;

sending, from the first user to the second user, a negative response to the message;

generating, by the second user, a further message based on the negative response;

generating, by the second user, a signature for the further message;

receiving, by the first user, the further message and the signature of the second user for the further message;

verifying, by the first user, the signature for the further message generated by the second user;

sending, from the first user to the second user, a positive response to the further message; and determining, by the first user, to generate the second public key using the received further message and the received signature for the further message.

3. The method of claim 1 comprising:

sending, from the first user to the second user, information of the blockchain transaction based on the transaction template information;

sending, from the first user to the second user, full data of a transaction referenced by an input of the blockchain transaction;

sending, from the first user to the second user, a Merkle path for the transaction referenced by the input of the blockchain transaction; and sending, from the first user to the second user, a block height of a block comprising the transaction referenced by the input of the blockchain transaction.

4. The method of claim 1, the method comprising:

when the third public key is not equal to the second public key, sending from the second user to the first user a request for the first user to provide a sixth public key to replace the second public key.

5. The method of claim 1, comprising:

monitoring the blockchain network by the first user to check whether the transaction has been submitted on the blockchain network.

6. The method of claim 1, wherein the message comprises at least one of: an invoice; a contract; an agreement.

7. A computer-implemented method performed by a second user, the method comprising:

generating a signature for a first message;

receiving, from a first user, a second public key generated from: a first public key of the first user, a first message sent from the second user to the first user, and the signature for the first message;

determining, a third public key based on: the first public key, a second message, and the generated signature for the second message;

verifying whether the third public key is equal to the second public key;

when the third public key is equal to the second public key, determining that the first message is equal to the second message and submitting a blockchain transaction comprising the second public key to a blockchain network;

wherein prior to receiving the second public key from the first user, the method comprises:

generating a signature for a message;

sending, to the first user, the message and the signature for the message;

receiving, from the first user, a positive response to the message;

wherein when the positive response is received from the first user, the method comprises:

sending transaction template information to the first user, the transaction template information comprising a fourth public key of the second user in a first locking script of the transaction template information;

receiving details of the transaction from the first user based on the transaction template information, the details of the blockchain transaction comprising:

a signature from a fifth public key of the first user in an unlocking script of the transaction template information;

transaction input information in an outpoint in the transaction template; and the second public key in a second locking script of the transaction template information.

8. The method of claim 7, wherein prior to receiving the second public key from the first user, the method comprises:

generating a signature for a message;

sending, to the first user, the message and the signature for the message;

receiving, from the first user, a negative response to the message;

generating a further message based on the negative response;

generating a signature for the further message;

sending, to the first user, the further message and the signature for the further message; and receiving, from the first user, a positive response for the further message from the first user.

9. The method of claim 7, comprising:

receiving, from the first user, information of the blockchain transaction based on the transaction template information;

receiving, from the first user, full data of a transaction referenced by an input of the blockchain transaction;

receiving, from the first user, a Merkle path of the transaction referenced by the input of the blockchain transaction; and receiving, from the first user, a block height of a block comprising the transaction referenced by the input of the blockchain transaction.

10. The method of claim 7, the method comprising:

when the third public key is not equal to the second public key, sending to the first user a request for the first user to provide a sixth public key to replace the second public key.

11. The method of claim 7, wherein the message comprises at least one of: an invoice, a contract, an agreement.

12. A computer-implemented method performed by a first user having a first public key, the method comprising:

generating a second public key for a transaction based on: a first public key, a first message sent from a second user to the first user, and a signature for the first message generated by the second user;

providing the second public key to the second user;

wherein prior to providing the second public key to the second user, the method comprises:

receiving, from the second user, a message and a signature for the message generated by the second user;

verifying the signature for the message generated by the second user;

sending, to the second user, a positive response to the message;

determining to generate the second public key using the received message and the received signature for the message;

wherein when the positive response is sent to the second user, the method comprises:

receiving transaction template information from the second user in response to the second user receiving the positive response, the transaction template information comprising a fourth public key of the second user in a first locking script of the transaction template information; and using the transaction template information to provide details of the blockchain transaction by:

providing a signature from a fifth public key of the first user in an unlocking script of the transaction template information;

providing transaction input information as an outpoint in the transaction template; and including the second public key in a second locking script of the transaction template information.

13. The method of claim 12, wherein prior to providing the second public key to the second user, the method comprises:

receiving a message and a signature for the message generated by the second user;

sending, to the second user, a negative response to the message;

receiving a further message and a signature of the second user for the further message;

verifying the signature for the further message generated by the second user;

sending, to the second user, a positive response to the further message; and determining to generate the second public key using the received further message and the received signature for the further message.

14. The method of claim 12, comprising:

sending, to the second user, information of the blockchain transaction based on the transaction template information;

sending, to the second user, full data of the transaction referenced by an input of the blockchain transaction;

sending, to the second user, Merkle paths of the transaction referenced by the input of the blockchain transaction; and sending, to the second user, a block height of a block comprising the transaction referenced by the input of the blockchain transaction.

15. A computer-implemented method performed in a system comprising a first user with a first public key and a second user, the method comprising:

generating, by the first user, a second public key based on: the first public key, a first message sent from the second user to the first user, and a signature for the first message generated by the second user;

providing, by the first user, the second public key to the second user;

determining, by the second user, a third public key based on: the first public key, a second message, and the signature for the second message generated by the second user;

verifying, by the second user, whether the third public key is equal to the second public key;

when the third public key is equal to the second public key, determining that the first message is equal to the second message and submitting a blockchain transaction comprising the second public key to a blockchain network;

when the third public key is not equal to the second public key, sending from the second user to the first user a request for the first user to provide a sixth public key to replace the second public key.

16. A computer-implemented method performed by a second user, the method comprising:

generating a signature for a first message;

receiving, from a first user, a second public key generated from: a first public key of the first user, a first message sent from the second user to the first user, and the signature for the first message;

determining, a third public key based on: the first public key, a second message, and the generated signature for the second message;

verifying whether the third public key is equal to the second public key;

when the third public key is equal to the second public key, determining that the first message is equal to the second message and submitting a blockchain transaction comprising the second public key to a blockchain network;

when the third public key is not equal to the second public key, sending to the first user a request for the first user to provide a sixth public key to replace the second public key.

* * * * *